(12) United States Patent
Trutna (10) Patent No.: US 10,222,879 B2
(45) Date of Patent: Mar. 5, 2019

(54) INTERLOCKING INTEGRATED BATTERY STRUCTURE FOR AN ELECTRONIC STYLUS

(71) Applicant: Microsoft Technology Licensing, LLC, Redmond, WA (US)

(72) Inventor: Tristan Thomas Trutna, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 712 days.

(21) Appl. No.: 14/675,441

(22) Filed: Mar. 31, 2015

(65) Prior Publication Data

US 2016/0291706 A1 Oct. 6, 2016

(51) Int. Cl.
*G06F 3/0354* (2013.01)
*G06F 3/038* (2013.01)
*H01M 2/10* (2006.01)

(52) U.S. Cl.
CPC .......... *G06F 3/03545* (2013.01); *G06F 3/038* (2013.01); *H01M 2/1022* (2013.01)

(58) Field of Classification Search
CPC ............. G06F 3/03545; Y10T 403/556; Y10T 403/56; F16B 7/18; F16B 7/182; A24F 47/008
USPC ................................................. 403/296, 299
See application file for complete search history.

(56) References Cited

U.S. PATENT DOCUMENTS

| | | | |
|---|---|---|---|
| 5,302,110 A | 4/1994 | Desai et al. | |
| 5,472,804 A | 12/1995 | Austin et al. | |
| 5,536,595 A | 7/1996 | Inkmann et al. | |
| 6,618,936 B2 | 9/2003 | Bovio et al. | |
| 7,964,303 B2 | 6/2011 | Takeshita et al. | |
| 7,981,535 B2 | 7/2011 | Scott et al. | |
| 8,291,567 B1 | 10/2012 | Keenan et al. | |
| 9,110,523 B2 * | 8/2015 | Mann | G06F 3/0383 |

(Continued)

FOREIGN PATENT DOCUMENTS

CN 201877530 U 6/2011

OTHER PUBLICATIONS

"International Search Report & Written Opinion Issued in PCT Application No. PCT/US2016/020312", dated Jun. 8, 2016, 10 Pages.

(Continued)

*Primary Examiner* — Josh Skroupa
*Assistant Examiner* — Cory B Siegert
(74) *Attorney, Agent, or Firm* — Holzer Patel Drennan (57) ABSTRACT

The disclosed technology provides for a device and method related to powering an electronic stylus with a removable, integrated battery that acts as a structural segment and external casing along the long axis of the stylus body. The integrated battery incorporates interlocking features, which removes the need for an external tube around a battery cell. As a result, the electronic stylus has one structural component performing multiple functions (e.g., providing power, functioning as the stylus casing), which achieves a more lightweight and compact electronic stylus. The placement of the battery along the long axis can vary to provide comfortable weight distribution for writing, which can involve an interlocking interface at one end of the battery or at both ends of the battery (e.g., to interlock with one or both ends of the electronic stylus).

15 Claims, 10 Drawing Sheets

(56) References Cited

U.S. PATENT DOCUMENTS

| | | | |
|---|---|---|---|
| 9,122,322 B2* | 9/2015 | Stern | G06F 3/03545 |
| 9,274,618 B2* | 3/2016 | Ho | G06F 3/03545 |
| 2009/0162748 A1 | 6/2009 | Fan et al. | |
| 2009/0251442 A1* | 10/2009 | Nakata | G06F 3/033 362/118 |
| 2009/0286150 A1 | 11/2009 | Nelson et al. | |
| 2010/0021022 A1* | 1/2010 | Pittel | G06F 3/03545 382/123 |
| 2010/0149794 A1* | 6/2010 | Xu | G06F 3/03545 362/183 |
| 2010/0330400 A1 | 12/2010 | Hu et al. | |
| 2013/0108907 A1 | 5/2013 | Bhardwaj et al. | |
| 2014/0176511 A1* | 6/2014 | Lin | G06F 3/03545 345/179 |
| 2014/0205893 A1 | 7/2014 | You et al. | |
| 2014/0267180 A1* | 9/2014 | Buelow | G06F 3/03545 345/179 |
| 2014/0300586 A1* | 10/2014 | Dowd | G06F 3/03545 345/179 |
| 2014/0327657 A1* | 11/2014 | Huang | G06F 3/03545 345/179 |
| 2015/0015547 A1* | 1/2015 | Lin | G06F 3/03545 345/179 |
| 2015/0022487 A1* | 1/2015 | Kuo | G06F 3/044 345/174 |
| 2015/0040927 A1* | 2/2015 | Li | A24F 7/00 131/329 |
| 2015/0042624 A1* | 2/2015 | Hashimoto | G06F 3/03545 345/179 |
| 2015/0047660 A1* | 2/2015 | Liu | A24F 47/008 131/329 |
| 2015/0062070 A1* | 3/2015 | Fang | G06F 3/03545 345/174 |
| 2015/0173421 A1* | 6/2015 | Hsieh | A24F 47/008 131/329 |
| 2015/0193027 A1* | 7/2015 | Robinson | G06F 3/03545 345/179 |
| 2015/0309598 A1* | 10/2015 | Zeliff | G06F 3/044 345/179 |
| 2015/0324019 A1* | 11/2015 | Takahashi | G06F 3/03545 345/179 |

OTHER PUBLICATIONS

"International Preliminary Report on Patentability Issued in PCT Application No. PCT/US2016/020312", dated Aug. 8, 2017, 6 Pages.

"Second Written Opinion Issued in PCT Application No. PCT/US2016/020312", dated Feb. 6, 2017, 5 Pages.

* cited by examiner

INTERLOCKING INTEGRATED BATTERY STRUCTURE FOR AN ELECTRONIC STYLUS

DETAILED DESCRIPTION

Electronic styluses are used to provide input to stylus-enabled (e.g., pen-enabled) input devices, including drawing tablets, touch-sensitive systems (e.g., computer tablets), non-touch-sensitive input systems (e.g., some point-of-sale terminals and drawing tablets), embedded devices, and mobile computers. The stylus-enabled input devices may or may not include a stylus-enabled display, although in some implementations, a non-display stylus-enabled input device can work in coordination with a display so that actions made through the input device are visually presented on the associated display.

Users desire lightweight and smaller styluses for convenience during use and storage. However, there are challenges relating to manufacturing such electronic styluses, including electronic brushes, markers, and pens for computer input. A multitude of electronic stylus components (e.g., batteries, electronic circuits, casings, light sensors, soft-touch grip, textured shafts, tapered bits, etc.) can be employed to provide a variety of computing applications (e.g., sending and/or receiving data and other messages from a program executing on a stylus-enabled input device), thereby resulting in larger and heavier electronic styluses (e.g., as compared to non-electronic styluses) to accommodate circuits and a power supply. It is challenging to reduce the size and weight of these components while providing desirable features and functionality of an advanced electronic stylus.

For example, an electronic stylus can include a battery enclosure for receiving a standard battery to power the electronic stylus. The discrete natures of the battery and the battery enclosure lead to a dominant design space limitation arising from, among various factors, the size of existing batteries, the spacing between the battery and the battery enclosure, and the discrete electrical connections (e.g., springs, electrodes, etc.) between the stylus electronics and the battery.

The disclosed technology provides for a device and method related to powering an electronic stylus with a removable integrated battery, wherein an interlocking battery structure acts as an integrated structural segment and external casing along the long axis of the electronic stylus body. The integrated battery of the disclosed technology incorporates interlocking features to connect to and integrate with one or more other segments of the electronic stylus, thus removing the oversized tube or other battery enclosure encompassing a standard battery cell. The battery with its integrated external casing is not slipped inside a battery enclosure but instead forms a distinct structural battery segment of the electronic stylus, the battery segment having an external casing that operates as the exterior surface of a structural segment of the electronic stylus. Accordingly, the total diameter of the electronic stylus is significantly reduced (e.g., by as much as 20%) as compared to standard batteries inside non-integrated battery enclosures. The described technology can also result in a lighter design as compared to standard batteries inside a non-integrated battery enclosure by integrating the structural casing of the electronic stylus and the battery—only one casing contributes to the weight and size of the electronic stylus.

The integrated battery segment can also be used to provide different weight distribution options along the long axis of the electronic stylus. The placement of the battery segment at different points along the long axis and/or at different orientations can provide adjustable weight distribution for writing. For example, an interlocking interface at either end of a battery segment having a non-uniform weight distribution (e.g., to interlock with one or both ends of the electronic stylus) can provide flexibility in weight distribution of the assembled electronic stylus. The orientation of the battery segment can be reversed along the long axis of the electronic stylus. In another implementation, multiple battery segments and/or weighting segments may be connected (e.g., in series) along the long axis of the electronic stylus to provide customizable weight distributions. In such implementations, the weighting segments can provide conductors to electrically connect the various segments so that stylus electronics can be powered by at least one battery cell of a battery segment. As such, one or more battery segment length's and weight distribution's can be assembled to provide for comfortable weight distribution for a single-ended interlocking battery segment, while maintaining the replaceable nature of the battery segment.

As a result of this technology, an interlocking integrated battery structure forms a structural battery segment of an electronic stylus. The structural battery segment can perform multiple functions (e.g., providing external structural casing, weight distribution options, and power for electronic components), thus achieving a lightweight, compact, and/or functional electronic stylus.

Figure 1:
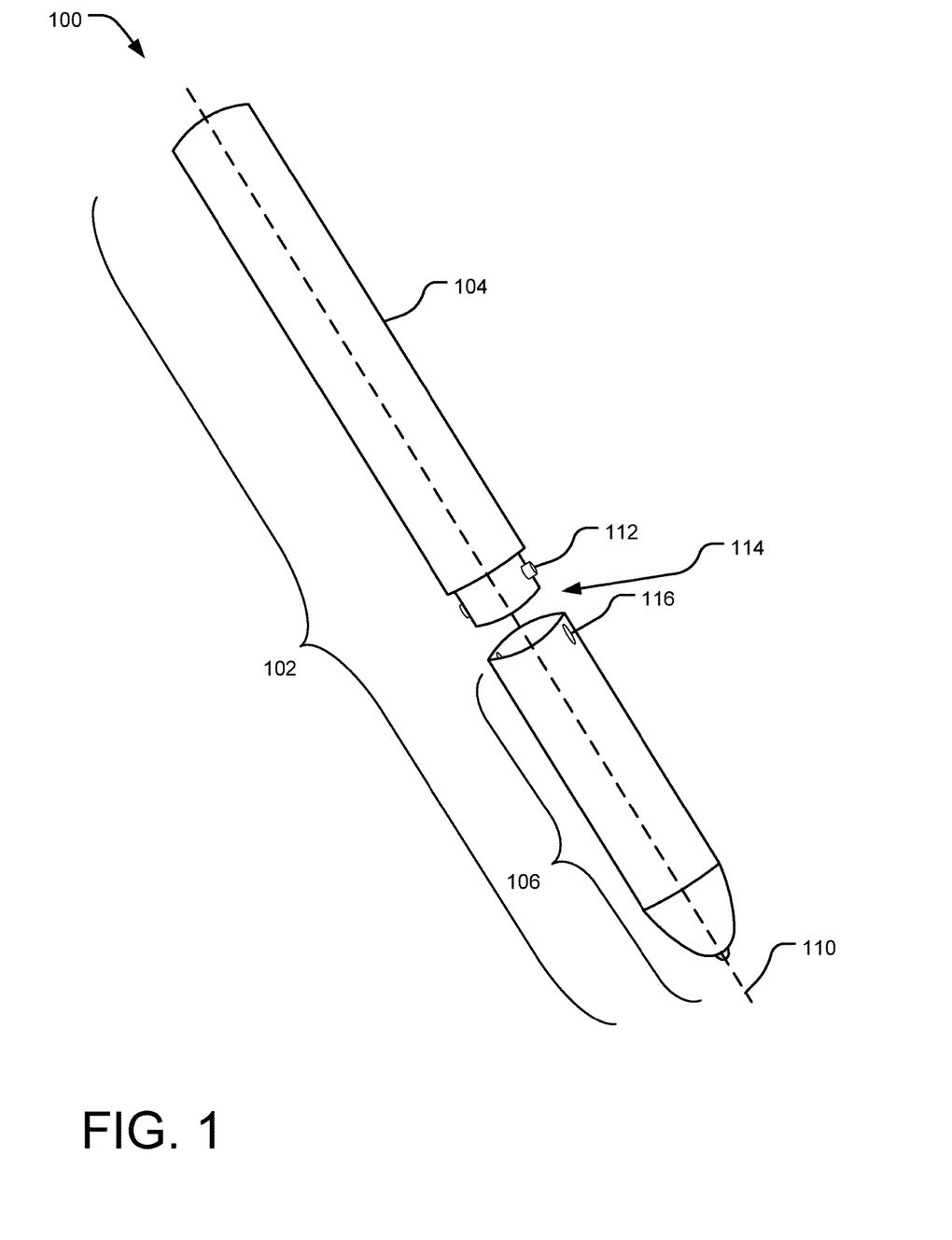
FIG. 1 illustrates a perspective view of an example interlocking integrated battery structure for an electronic stylus.

FIG. 1 illustrates a perspective view of an example interlocking integrated battery structure 104 for an electronic stylus 100. There are two segments of the stylus body 102. There is a head segment 106 of the stylus body 102 attached to an interlocking integrated battery structure (or segment) 104 of the stylus body 102. In another implementation, the head segment 106 of the stylus body is attached to a battery segment 104 of the stylus body 102, and the battery segment 104 is also attached to an end segment (not shown) of the stylus body 102 (as described in further detail in FIGS. 7, 8, and 9). In other implementations, there can be additional segments of the body or a variety of configurations of the segments of the stylus body 102. Such additional segments or varying configurations can be used, for example, when replacing one or more battery segments, altering weight distribution, or adding or changing location of one or more weighting segments in the electronic stylus 100.

A weighting segment includes an interlocking segment that can be added to providing additional weight and/or length to adjust the weight distribution and/or length of the electronic stylus 100. In some implementations, a weighting segment includes conductive paths to connect the electrodes of other segments on either end of the weighting segment.

The battery segment 104 includes a one or more battery cells integrated with an external casing configured as a replaceable, interlocking structural battery segment along the long axis 110 of the electronic stylus 100. The battery segment 104, alone or in concert with other battery segments of the stylus body 102, can be interconnected in the electronic stylus 100. In another example, there can be multiple battery cells or multiple battery segments to provide increased power to the electronic stylus 100 or to power different electronic features (e.g., one battery segment or cell can power the electronics in the head segment 106 of the electronic stylus 100 while another battery cell or segment powers an on/off light and/or a battery level light on the other end of electronic stylus 100). The battery segment 104 can provide power to the stylus electronics via a variety of connections (as described further in detail in FIGS. 6, 8 and 9). Conductive traces within the external casing of the battery segment 104 can be used as a current path for the electrical power connection between battery cell(s) and stylus electronics.

The head segment 106 of the stylus body 102 interacts with a stylus-enabled input system, such as a computer tablet, a touch screen, a drawing tablet, an embedded device, or mobile computer, and communicates corresponding input to the stylus-enabled input system via radio frequency, electrostatic, light emission or other transmissions. Communications circuits (not shown) and other stylus electronics can be located in the head segment 106 of the stylus body 102, and/or other segments of stylus body 102. Such electronics can facilitate communications with a user (e.g., a blinking low power light), with a recharging system (e.g., via a recharging port), between the electronic stylus 100 and a computing device or stylus-enabled input device (e.g., a tablet computer, a touch pad, a point-of-sale system, a drawing tablet) using or in association with stylus-enabled input technology (e.g., capacitive touch screen technology, wireless technology, Bluetooth, etc.), and between other stylus and computer interfaces.

The battery segment 104 can interlock or attach to the head segment 106 or other segments of the stylus body 102 by a variety of attaching mechanisms (e.g., latch mechanism, screw mechanism, friction fit, cam lock, bayonet lock, etc.). For example, the battery segment 104 can attach to the head segment by a spring-loaded latch mechanism. Clips or posts 112 affixed to the end of a battery segment 104 can lock through holes 116, slots, channels, or grooves on the head segment 106 of the stylus body 102. In another implementation, a user can utilize a screw mechanism on the stylus body segments by screwing a threaded end of a battery segment into a threaded receiving end of a head segment or another segment of the stylus body.

A user can attach the two segments (e.g., battery segment 104 and head segment 106) of the stylus body 102 in FIG. 1 to each other by a locking mechanism. In this implementation, posts (e.g., post 112) protrude out from an attaching end 114 of the battery segment 104. The attaching end 114, which has a smaller diameter than the head segment 106 in FIG. 1. In alternative implementations, the male-female configurations of the various segments may be interchanged.

As a user engages the battery segment 104 with the head segment 106, the attaching end 114 of the battery 104 slides into the head segment 106 with a larger diameter. The post 112 retracts into the attaching end 114 via a spring-loaded mechanism. The head segment 106 has post slots or holes (e.g., slot 116) located near the end of the head segment 106. A user can align the post 112 with the slot 116. Once aligned, the post 112 can release from a retracted position inside the attaching end 114 and extend through the slot 116, locking the two segments (battery segment 104 and head segment 106) of the body 102 in place. Power connections between the battery segment 104 and the head segment 106 can be aligned based on the alignment of the post 112 and the slot 116. In some implementations, there can be more than one post and one slot. In alternative implementations, the posts may be on the head segment and the slots may be on the battery segment. Other configurations may also be employed.

In some circumstances, a user may want to disengage or detach the battery segment 104 from the head segment 106. For example, the user may need to recharge a rechargeable battery segment 104 or replace the battery segment 104 with a new battery segment having more charge. To disengage the battery segment 104 from the head segment 106, a user can push the post 112 into the attaching end 114 through the slot 116, thereby pushing the spring in the attaching end 114 together, while simultaneously pulling the battery segment 104 out of the head segment 106.

In some implementations, the electronic stylus 100 can communicate to the user a battery charge level for purposes of recharging or replacing the battery. The electronic stylus 100 can communicate by a variety of methods (e.g., interface, alarm, light signal, tactile feedback mechanism, etc.), whether implemented at a head segment, an end segment, a battery segment, or via some external interface (e.g., the computing device interface via wireless communications). For example, a low charge can be communicated to a user by a blinking red light on the head segment 106 or some other segment.

Figure 2:
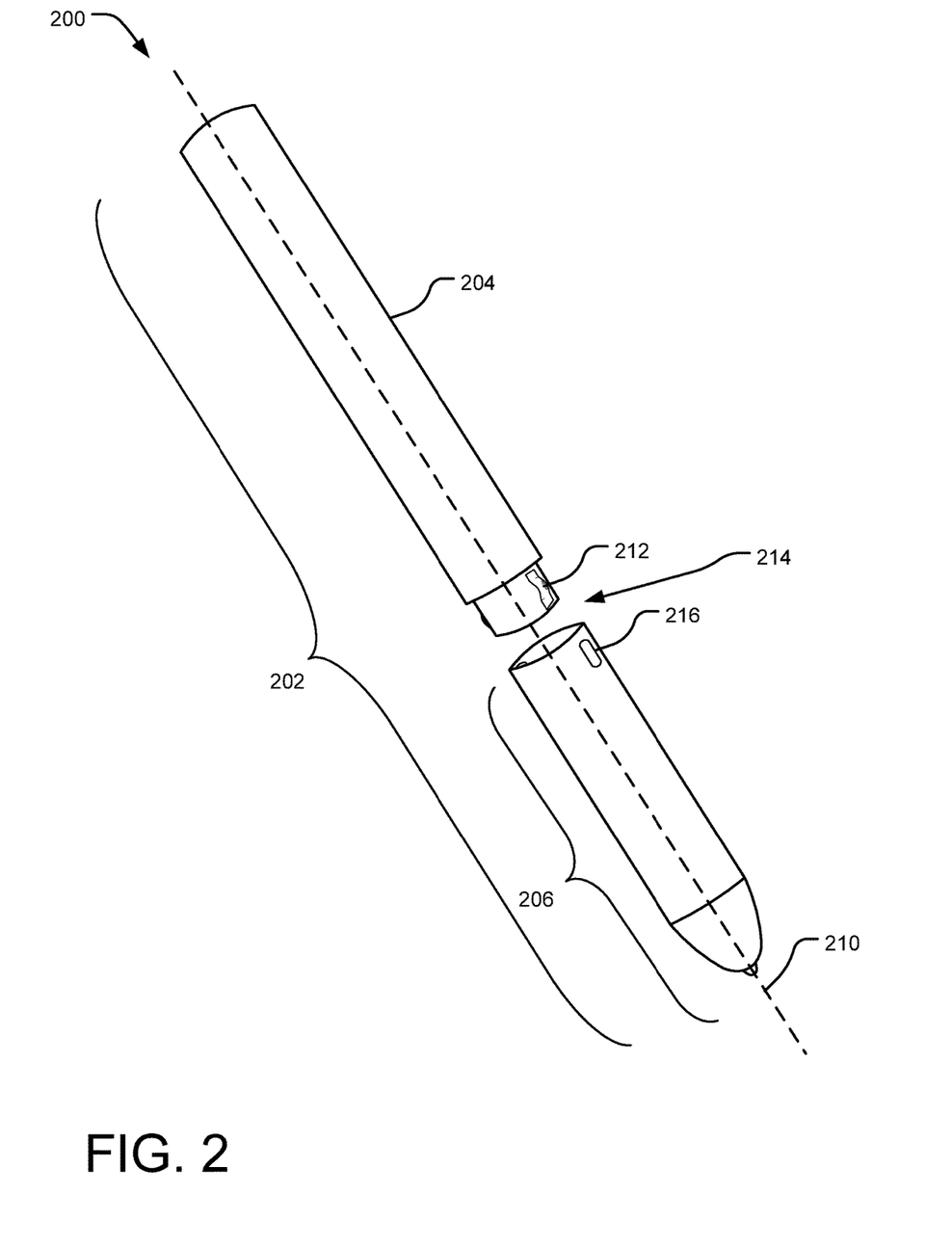
FIG. 2 illustrates a perspective view of another example interlocking integrated battery structure for an electronic stylus.

FIG. 2 illustrates a perspective view of another example interlocking integrated battery structure 204 for an electronic stylus 200. There are two segments of a stylus body 202 shown, a battery segment 204 and a head segment 206, although other segments may be employed. Alternative implementations may also include multiple battery segments.

Figure 7:
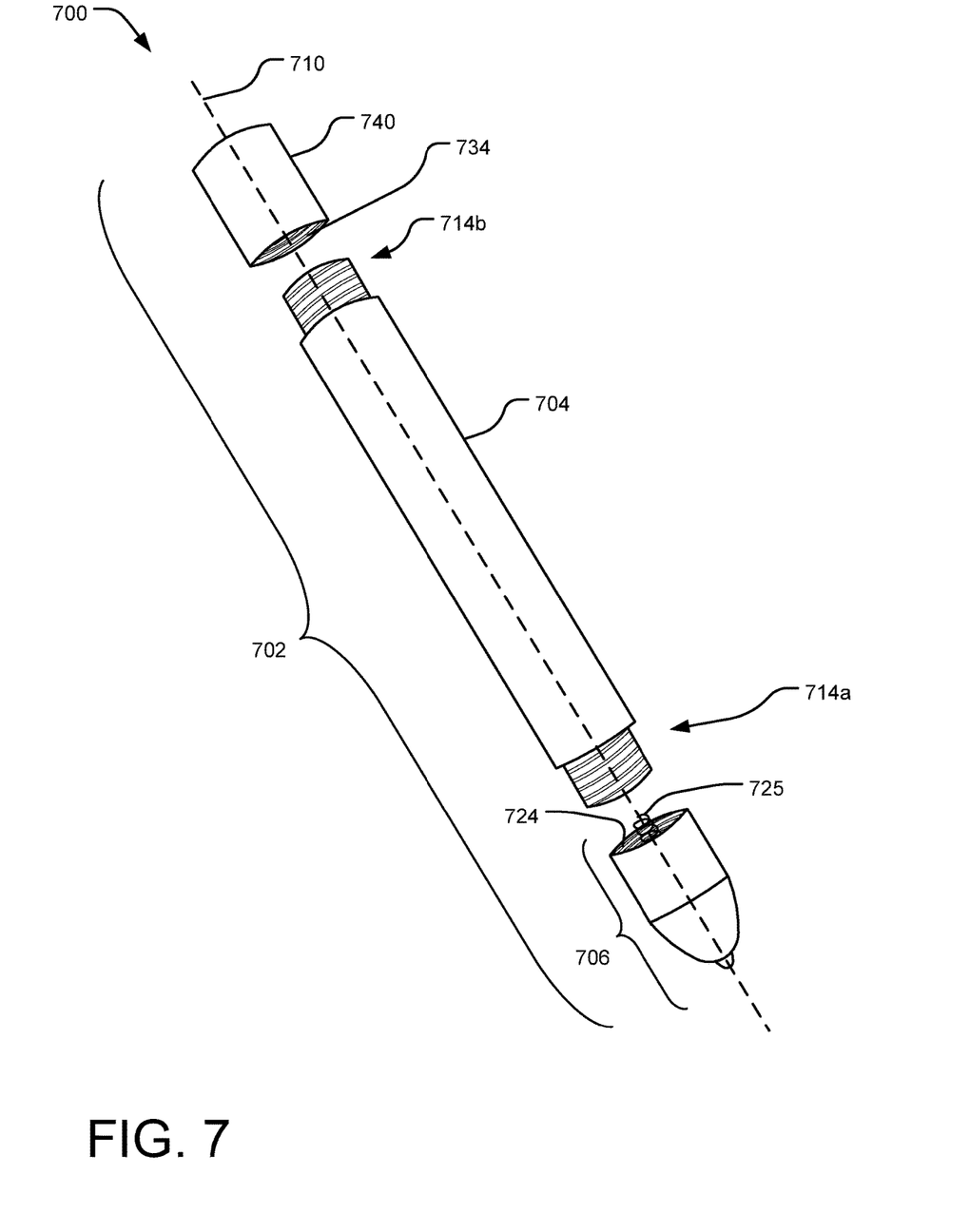
FIG. 7 illustrates a perspective view of another example interlocking integrated battery structure for an electronic stylus.
Figure 8:
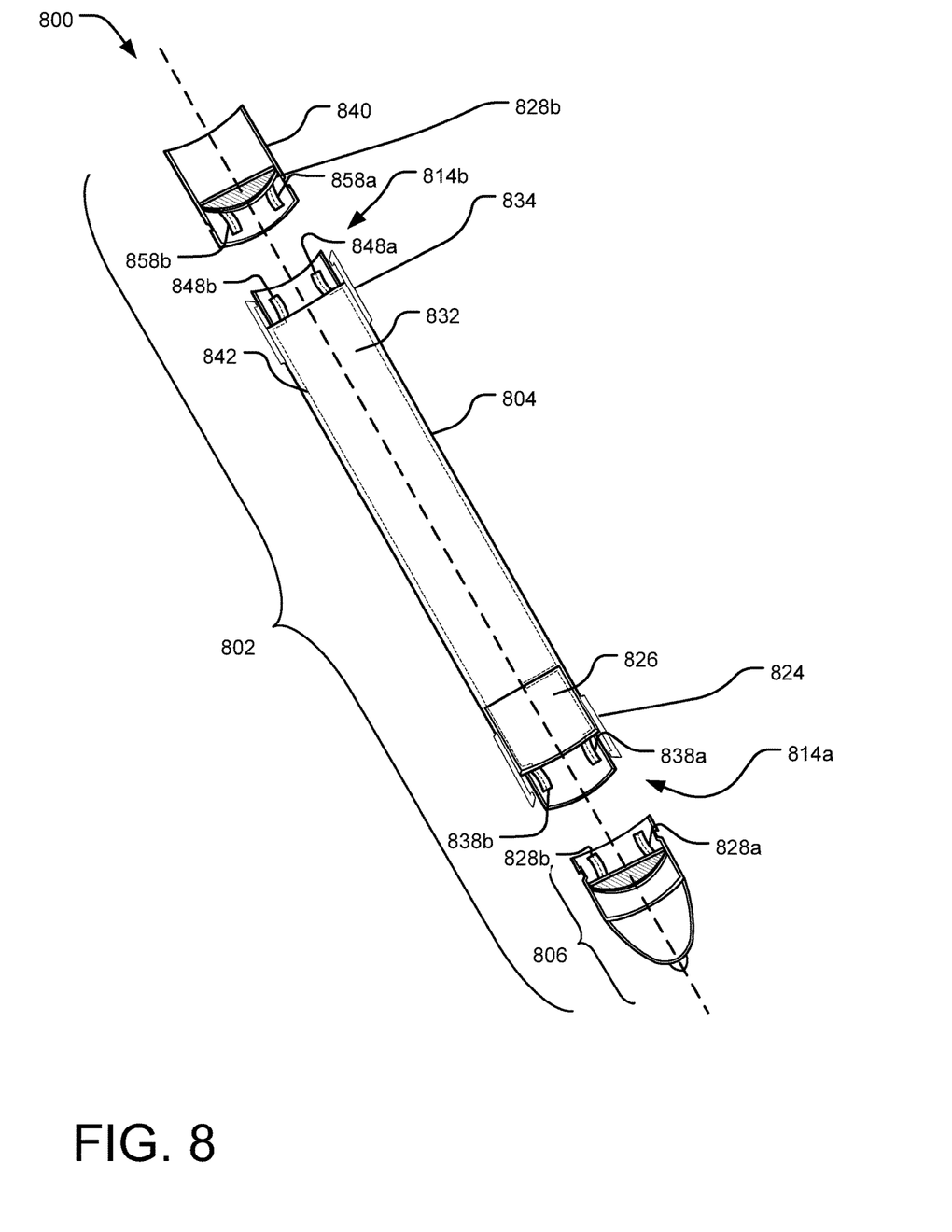
FIG. 8 illustrates a cross-sectional view of an example interlocking integrated battery structure for an electronic stylus.
Figure 9:
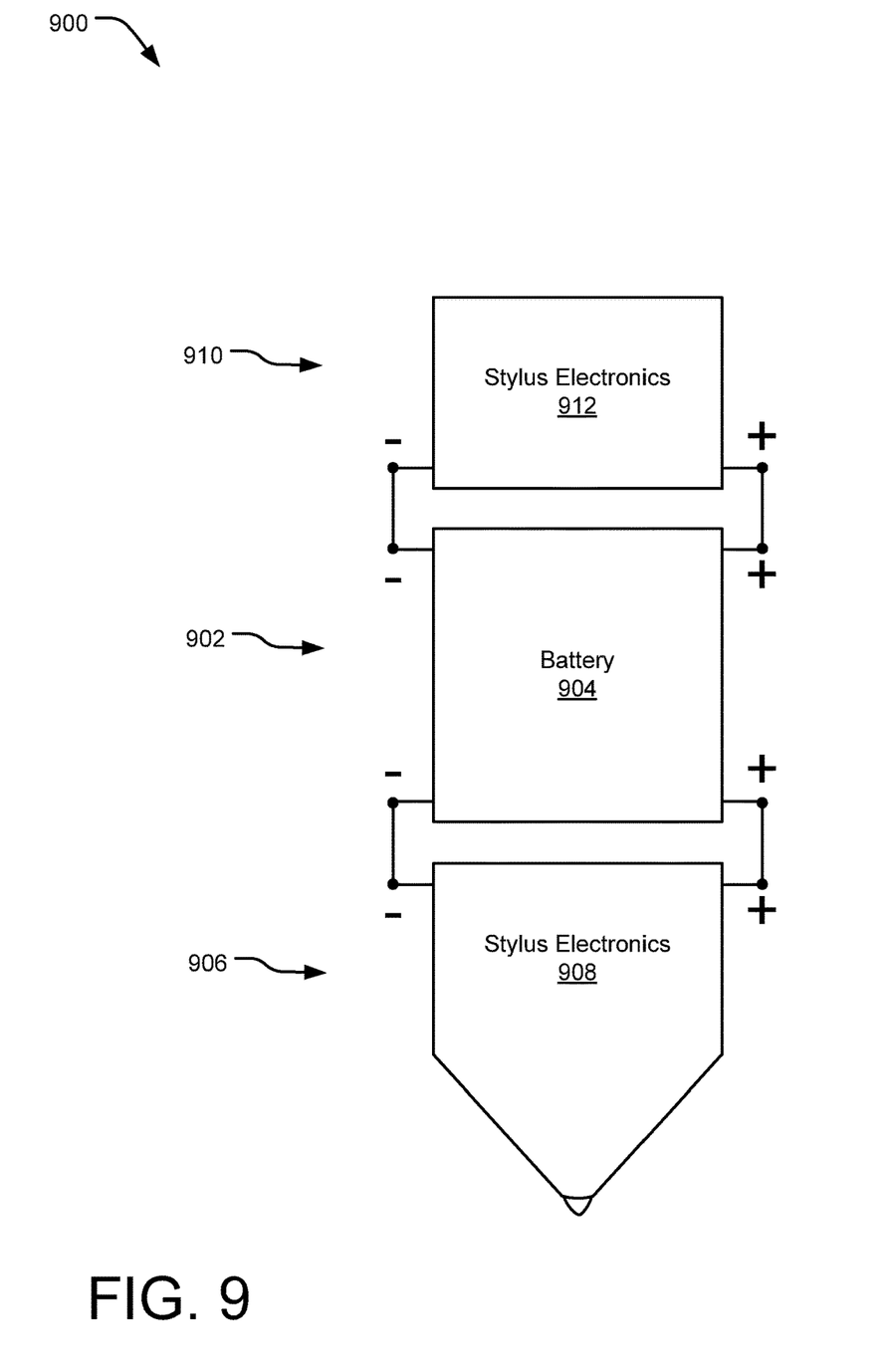
FIG. 9 illustrates a schematic of an example interlocking integrated battery structure for an electronic stylus.

In another implementation, the head segment 206 of the stylus body 202 is configured to connect to the battery segment 204 of the stylus body 202, and the battery segment 202 can also be attached to an end segment (not shown) of the stylus body 202 (as described in further detail in FIGS. 7, 8, and 9). In yet other implementations, there can be additional segments of the body or a variety of configurations of the segments of the stylus body 202. Such additional segments or varying configurations can be used, for example, when replacing one or more battery segments, altering weight distribution, or adding or changing location of one or more additional weights in the electronic stylus.

The battery segment 204 includes an integrated battery having an external casing and is configured as a replaceable, interlocking structural segment along the long axis 210 of the electronic stylus 300. The battery segment 204, alone or in concert with other battery segments of the stylus body 202, can be interconnected in the electronic stylus 200. The battery segment 204 provides power to the stylus electronics via a variety of connections (as described further in detail in FIGS. 6, 8, and 9). Conductive traces within the external casing of the battery segment 204 can be used as a current path for the electrical power connection between battery cell(s) and stylus electronics.

The head segment 206 of the stylus body 202 interacts with a stylus-enabled input system, such as a computer tablet, embedded device, or mobile computer, and communicates input to the stylus-enabled input system via radio frequency, light emission or other transmissions. Communications circuitry (not shown) is located in the head segment 206 of the body, and/or other segments of the body of the electronic stylus and facilitates connections between stylus input devices (e.g., an electronic stylus) to a stylus-enabled computing device or input surface (e.g., a tablet computer, drawing tablet, point-of-sale system, touch pad) using or in association with stylus-enabling technology (e.g., capacitive touch screen technology, wireless technology, Bluetooth, etc.). The communications circuitry is electronically connected to and powered by the battery segment 204.

In FIG. 2, a user can attach the two segments of the stylus body 202 via a locking mechanism. In this implementation, clips (e.g., clip 212) protrude out from an attaching end 214 of the battery segment 204, which has a smaller diameter than the head segment 206. When the user engages the battery segment 204 with the head segment 206 of larger diameter, the attaching end 214 of the battery segment 204 slides into the head segment 206. The clip 212 compresses into a flat position on the attaching end 214. The head segment 206 has clip slots or holes (e.g., slot 216) located near the end of the head segment 206. The user can align the clip 212 with the slot 216. Once aligned, the clip 212 can release from a compressed position in the attaching end 214 and extend through the clip hole 216, locking the two segments of the body 202 in place. In some implementations, more than one clip and/or more than one slot may be employed.

In some circumstances, the user may want to disengage or detach the battery segment 204 from the head segment 206. For example, the user may need to recharge a rechargeable battery cell. In an alternative implementation, the user may want to replace the battery segment 204 with a new battery segment having more charge. To disengage the battery segment 204 from the head segment 206, a user can push the clip 212 in through the clip hole 216 and pull the battery segment 204 out of the head segment 206. Other clipped implementations may be employed.

Figure 3:
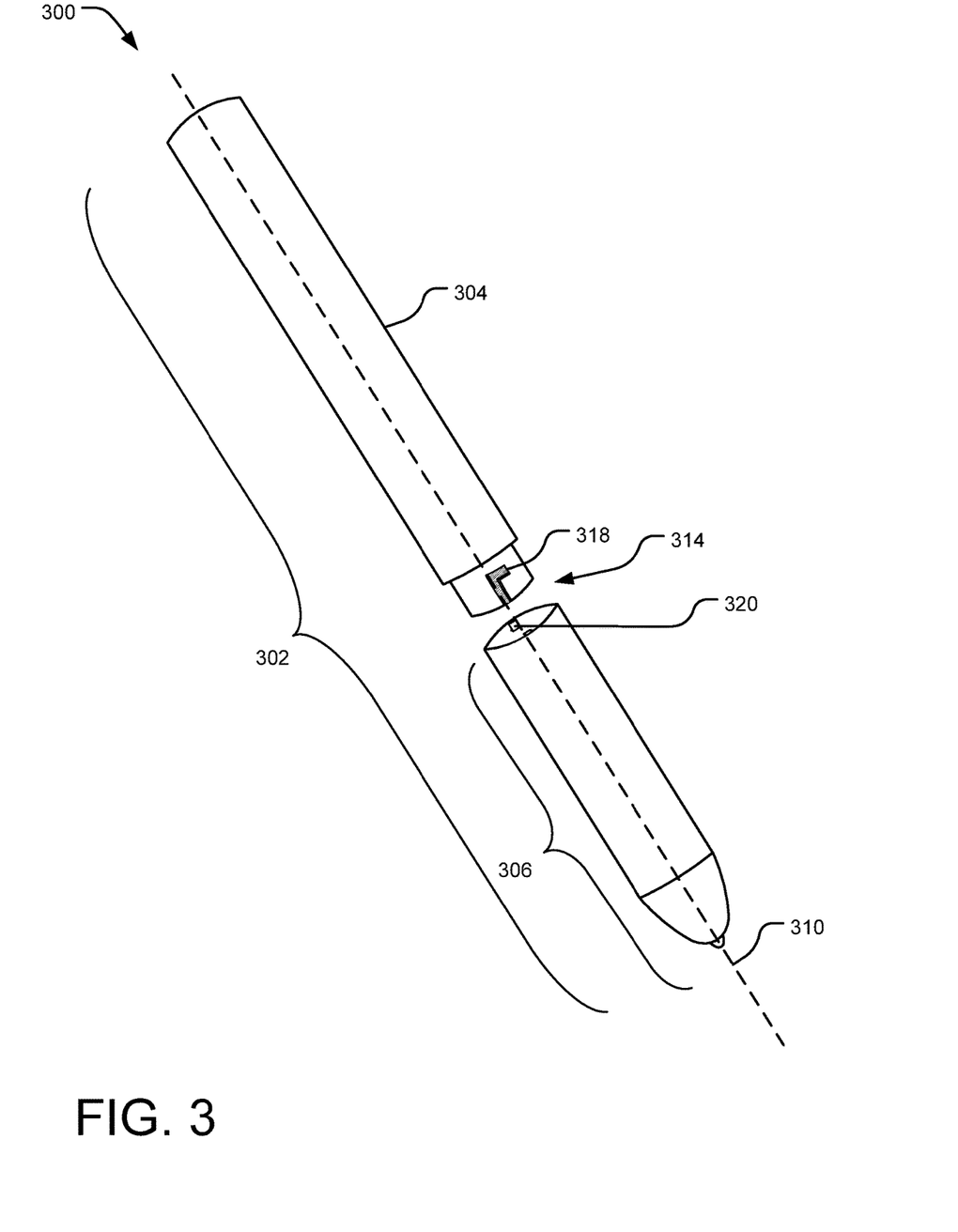
FIG. 3 illustrates a perspective view of another example interlocking integrated battery structure for an electronic stylus.

FIG. 3 illustrates a perspective view of another example interlocking integrated battery structure 304 for an electronic stylus 300. There are two segments of a stylus body 302 shown, a battery segment 304 and a head segment 306, although other segments may be employed. Alternative implementations may also include multiple battery segments.

In another implementation, the head segment 306 of the stylus body 302 connects to the battery segment 304 of the stylus body 302, and the battery segment 304 can also attach to an end segment (not shown) of the stylus body 302 (as described in further detail in FIGS. 7, 8, and 9). In other implementations, there can be additional segments of the stylus body 302 or a variety of configurations of the segments of the stylus body 302. Such additional segments or varying configurations can be used, for example, when replacing one or more battery segments, altering weight distribution, or adding or changing location of one or more weighting segments in the electronic stylus 300.

The battery segment 304 integrates one or more battery cells into an external casing and is configured as a replaceable, interlocking structural segment along the long axis 310 of the electronic stylus 300. The battery segment 304, alone or in concert with other battery segments of the stylus body 302, can be interconnected in the electronic stylus 300. The battery segment 304 provides power to the communications circuits (not shown) and other stylus electronics via a variety of connections (as described further in detail in FIGS. 6, 8, and 9). Conductive traces within the external casing of the battery segment 304 can be used as a current path for the electrical power connection between battery cell(s) and stylus electronics.

The head segment 306 of the body interacts with a stylus-enabled input system, such as a computer tablet, embedded device, or mobile computer, and communicates input to the stylus-enabled input system via radio frequency, light emission or other transmissions. Communications circuitry (not shown) is located in the head segment 306 of the body, and/or other segments of the body of the electronic stylus and facilitates connections between stylus input devices (e.g., an electronic stylus) to a stylus-enabled computing device or input surface (e.g., a tablet computer, drawing tablet, point-of-sale system, touch pad) using or in association with stylus-enabling input technology (e.g., capacitive touch screen technology, wireless technology, Bluetooth, etc.). The communications circuitry is electronically connected to and powered by the battery segment.

In FIG. 3, a user can attach the two segments of the stylus body 302 by a locking mechanism. In this implementation, posts (e.g., post 320) protrude out from the interior wall of the head segment 306. The battery segment 304 has an attaching end 314, which has a smaller diameter than the head segment 306. The attaching end 314 has an L-shaped channel or groove 318. When the user engages the battery segment 304 with the head segment 306, the attaching end 314 of the battery segment 304 can slide into the head segment 306. The user can align the post 320 with the L-shaped channel 318. Once aligned, the post 320 can slide into the L-shaped channel 318. In this implementation, the post 320 can move vertically and then horizontally in an L-shaped path, while simultaneously, the battery 304 inserts into the head segment 306, locking the two segments of the stylus body 302 in place. In some implementations, more than one clip and/or more than one slot may be employed.

In some circumstances, the user may want to disengage or detach the battery segment 304 from the head segment 306. For example, the user may need to recharge a rechargeable battery cell. In an alternative implementation, the user may want to replace the battery segment 304 with a new battery having more charge. To disengage the battery segment 304 from the head segment 306, a user can rotate one of the two segments in a direction opposite to the L-shape, sliding the post 320 horizontally and then vertically, while simultaneously, pulling the battery segment 304 from the head segment 306.

Figure 4:
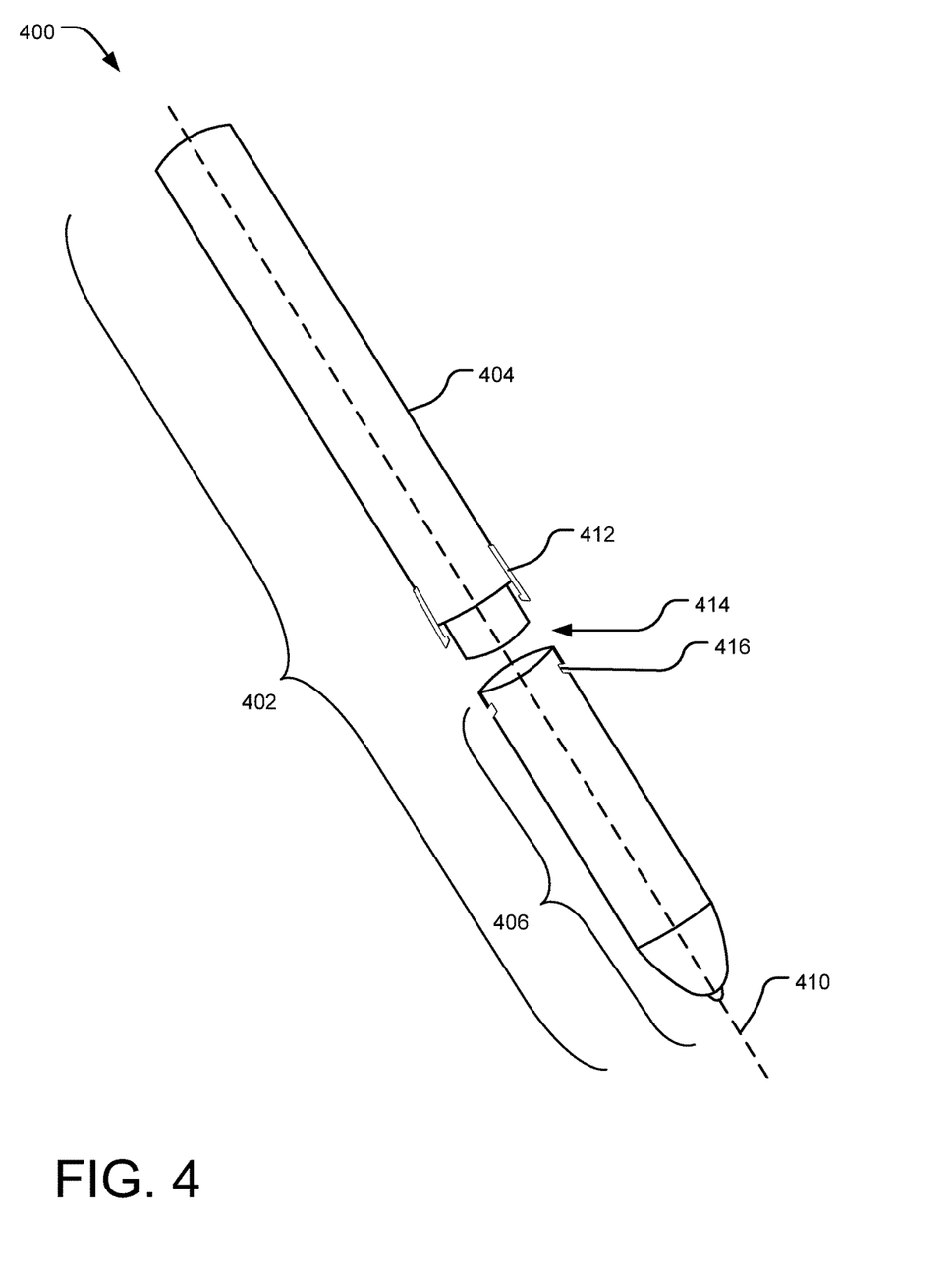
FIG. 4 illustrates a perspective view of another example interlocking integrated battery structure for an electronic stylus.

FIG. 4 illustrates a perspective view of another example interlocking integrated battery structure 404 for an electronic stylus 400. There are two segments of a stylus body 402 shown, a battery segment 404 and a head segment 406, although other segments may be employed. Alternative implementations may also include multiple battery segments.

In another implementation, the head segment 406 of the stylus body 402 connects to the battery segment 404 of the stylus body 402, and the battery segment 404 can also attach to an end segment (not shown) of the stylus body 402 (as described in further detail in FIGS. 7, 8 and 9). In other implementations, there can be additional segments of the stylus body 402 or a variety of configurations of the segments of the stylus body 402. Such additional segments or varying configurations can be used, for example, when replacing one or more battery segments, altering weight distribution, or adding or changing location of one or more weighting segments in the electronic stylus 400.

The battery segment 404 integrates one or more battery cells into an external casing and is configured as a replaceable, interlocking structural segment along the long axis 410 of the electronic stylus 400. The battery segment 404, alone or in concert with other battery segments of the stylus body 402, can be interconnected in the electronic stylus 400. The battery segment 404 provides power to the communications circuits (not shown) and other stylus electronics via a variety of connections (as described further in detail in FIGS. 6, 8, and 9). Conductive traces within the external casing of the battery segment 404 can be used as a current path for the electrical power connection between battery cell(s) and stylus electronics.

The head segment 406 of the body interacts with a stylus-enabled input system, such as a computer tablet, embedded device, or mobile computer, and communicates input to the stylus-enabled input system via radio frequency, light emission or other transmissions. Communications circuitry (not shown) is located in the head segment 406 of the body, and/or other segments of the body of the electronic stylus and facilitates connections between stylus input devices (e.g., an electronic stylus) to a stylus-enabled computing device or input surface (e.g., a tablet computer, drawing tablet, point-of-sale system, touch pad) using or in association with stylus-enabling input technology (e.g., capacitive touch screen technology, wireless technology, Bluetooth, etc.). The communications circuitry is electronically connected to and powered by the battery segment 404.

In FIG. 4, a user can attach the two segments of the stylus body 402 by a locking mechanism. In this implementation, clips (e.g., clips 412) protrude out from the exterior surface of the end of the battery segment 404, in proximity to an attaching end 414 of the battery segment 404. The attaching end 414 of the battery segment 404 has a smaller diameter than the head segment 406. When the user engages the battery segment 404 with the head segment 406, the attaching end 414 of the battery segment 404 slides into the head segment 406 of larger diameter. The clips 412 slide into slots or grooves (e.g., slot 416) located in the exterior surface of the head segment 406, locking the two segments of the stylus body 402 (battery segment 404 and head segment 406) in place. In some implementations, more than one clip and/or more than one slot may be employed.

In some circumstances, the user may want to disengage or detach the battery segment 404 from the head segment 406. For example, the user may need to recharge a rechargeable battery cell. In an alternative implementation, the user may want to replace the battery segment 404 with a new battery having more charge. To disengage the battery segment 404 from the head segment 406, a user can press the clips 412 and pull the battery segment 404 out of the head segment 406.

Figure 5:
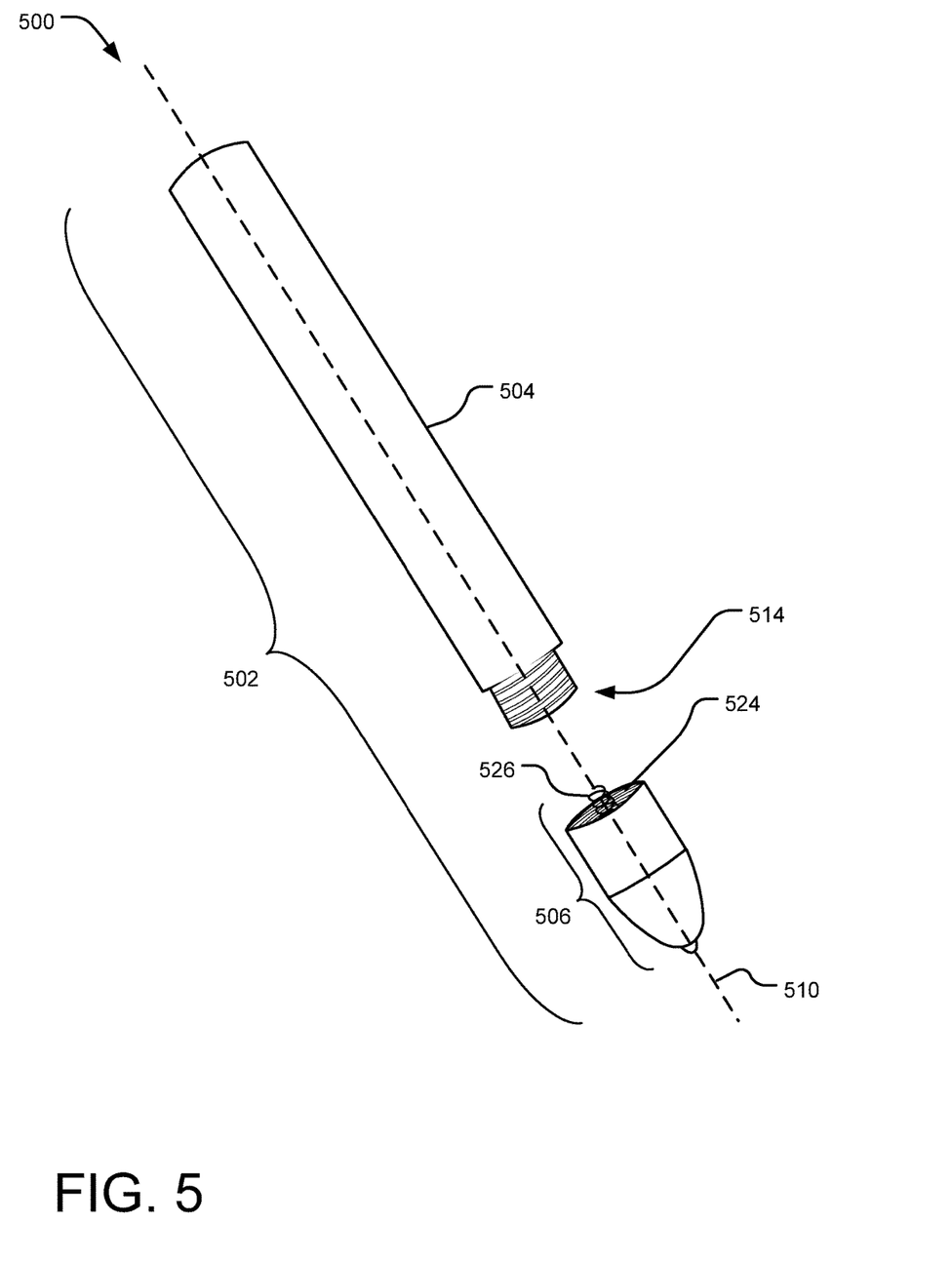
FIG. 5 illustrates a perspective view of an example interlocking integrated battery structure for an electronic stylus.

FIG. 5 illustrates a perspective view of another example interlocking integrated battery structure 504 for an electronic stylus 500. There are two segments of a stylus body 502 shown, a battery segment 504 and a head segment 506, although other segments may be employed. Alternative implementations may also include multiple battery segments.

In another implementation, the head segment 506 of the stylus body 502 connects to the battery segment 504 of the stylus body 502, and the battery segment 504 can also attach to an end segment (not shown) of the stylus body 502 (as described in further detail in FIGS. 7, 8 and 9). In other implementations, there may be additional segments of the stylus body 502 or a variety of configurations of the segments of the stylus body 502. Such additional segments or varying configurations can be used, for example, when replacing one or more battery segments, altering weight distribution, or adding or changing location of one or more weighting segments in the electronic stylus 500.

The battery segment 504 integrates one or more battery cells into an external casing and is configured as a replaceable, interlocking structural segment along the long axis 510 of the electronic stylus 500. The battery segment 504, alone or in concert with other battery segments of the stylus body 502, can be interconnected in the electronic stylus 500. The battery segment 504 provides power to the communications circuits (not shown) and other stylus electronics via a variety of connections (as described further in detail in FIGS. 6, 8, and 9). Conductive traces within the external casing of the battery segment 504 can be used as a current path for the electrical power connection between battery cell(s) and stylus electronics.

The head segment 506 of the body interacts with a stylus-enabled input system, such as a computer tablet, embedded device, or mobile computer, and communicates input to the stylus-enabled input system via radio frequency, light emission or other transmissions. Communications circuitry (not shown) is located in the head segment 506 of the body, and/or other segments of the body of the electronic stylus and facilitates connections between stylus input devices (e.g., an electronic stylus) to a stylus-enabled computing device or input surface (e.g., a tablet computer, drawing tablet, point-of-sale system, touch pad) using or in association with stylus-enabling input technology (e.g., capacitive touch screen technology, wireless technology, Bluetooth, etc.). The communications circuitry is electronically connected to and powered by the battery segment 504.

In the implementation in FIG. 5, a user can attach the two segments of the stylus body 502 by a screw locking mechanism. In this implementation, there is a threaded attaching end 514 of the battery segment 502, which has a smaller diameter than the head segment 506. The interior surface 524 of the head segment 506 is also threaded. The user can engage the battery segment 504 with the head segment 506 by screwing the threaded attaching end 514 of the battery segment 502 into the threaded interior surface 524 of the head segment 506 of larger diameter. Other alternative implementations may reverse the male-female configurations between the battery segment 504 and the head segment 506 or provide alternative interlocking configurations.

The head segment 506 includes an electrode 526 to electrically connect to the battery segment 504. Another electrode (not shown) is also provided by the head segment 506. Both electrodes electrically connected to corresponding electrodes in the battery segment 504 to complete the power supply circuit.

In some circumstances, the user may want to disengage or detach the battery segment 504 from the head segment 506. For example, the user may need to recharge a rechargeable battery. In an alternative implementation, the user may want to replace the battery 504 with a new battery having more charge. To disengage the battery segment 504 from the head segment 506, a user can unscrew the threaded attaching end 514 of the battery segment 504 out of the threaded interior surface 524 of the head segment 506.

Figure 6:
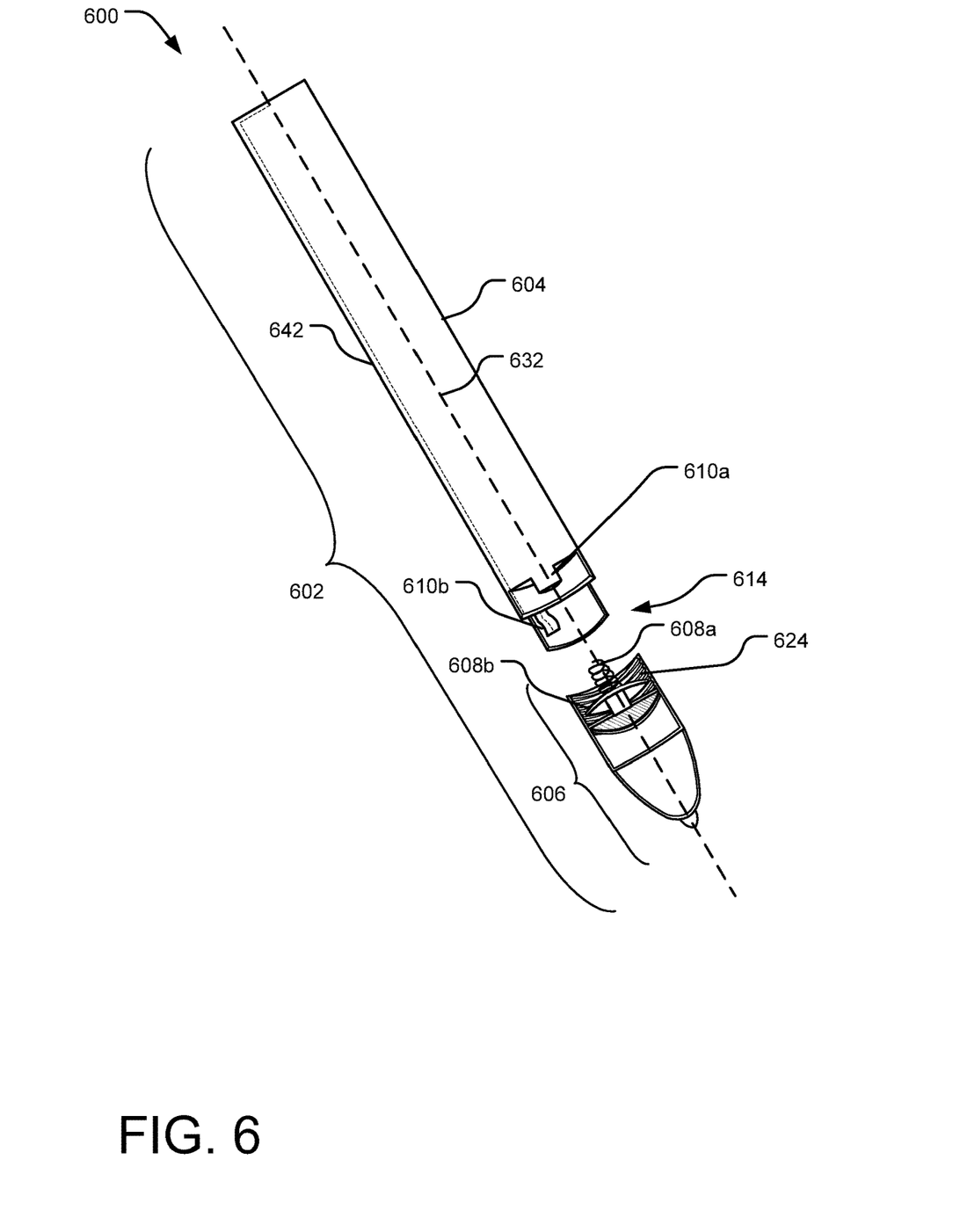
FIG. 6 illustrates a cross-sectional view of an example interlocking integrated battery structure for an electronic stylus.

FIG. 6 illustrates a cross-sectional view of an example interlocking integrated battery structure for an electronic stylus 600. There are two segments of a stylus body 602, a battery segment 604 and a head segment 606, although other segments may be employed. Alternative implementations may also include multiple battery segments.

In another implementation, the head segment 606 of the stylus body 602 connects to a battery segment 642 of the stylus body 602, and the battery segment 642 can also attach to an end segment (not shown) of the stylus body 602 (not shown but illustrated and described in further detail with regard to FIGS. 7, 8 and 9).

The battery segment 604 integrates one or more battery cells into external casing and is configured as a replaceable, interlocking structural segment along the long axis 610 of the electronic stylus 600. The battery segment 604, alone or in concert with other battery segments of the stylus body 602, can be interconnected in the electronic stylus 600. The battery segment 604 provides power to the communications circuits (not shown) and other stylus electronics via a variety of connections (as described further in detail in FIGS. 8 and 9). Conductive traces within the external casing of the battery segment 604 can be used as a current path for the electrical power connection between battery cell(s) and stylus electronics.

The head segment 606 of the body interacts with a stylus-enabled input system, such as a computer tablet, embedded device, or mobile computer, and communicates input to the stylus-enabled input system via radio frequency, light emission or other transmissions. Communications circuitry 608a is located in the head segment 606 of the body, and/or other segments of the body of the electronic stylus and facilitates connections between stylus input devices (e.g., an electronic stylus) to a stylus-enabled computing device or input surface (e.g., a tablet computer, drawing tablet, point-of-sale system, touch pad) using or in association with stylus-enabling input technology (e.g., capacitive touch screen technology, wireless technology, Bluetooth, etc.). The communications circuitry 608a is electronically connected to and powered by the battery segment 604.

The stylus electronics are electronically connected to and powered by the battery segment 604 by electrodes 608a and 608b in the head segment 606 and electrodes 610a and 610b in the battery segment. In FIG. 6, the electrode 610a is formed by a protrusion from the long axial center of the battery, and the electrode 610b is formed by a conductive trace, routing, or other conductive path integrated into the external casing of the battery segment 606, although other electrode configurations may be employed. The electrodes 608a, 608b, 610a, and 610b are configured to form an electrical power circuit when the head segment 606 and the body segment 604 are brought together and interlocked.

A user can interlock or attach the two segments of the body 602 by a screw locking mechanism, although other interlocking mechanisms may be employed. This illustrated implementation includes an attaching end 614 of the battery segment 604. The attaching end 614 is threaded on its outer surface as a male connection and has a smaller diameter than the head segment 606. An interior surface 624 of the head segment 606 is also threaded as a female connection. The user can engage the battery segment 604 with the head segment 606 by screwing the threaded attaching end 614 of the battery segment 604 into the threaded interior surface 624 of the head segment 606.

The battery segment 604 provides power to the stylus electronics via a variety of connections. For example, a current path or routing channel 642 forms a conducting lead and can run from the battery segment 604 via through the shell of the battery segment 604 and the shell of the head segment 606 to provide power to the communications circuits and/or stylus electronics when the battery segment 604 and head segment 606 are attached to each other. In other implementations, power conducting traces and/or other electrode configurations connect the battery segment 604 to the communications circuits and/or stylus electronics either inside the head segment 606 or in channels or grooves integrated in the exterior walls of the battery segment or head segment.

In one implementation, the battery segment 604 can be used in only one orientation along the long axis 632, although in alternative implementations, the battery segment 604 can be reversed in its orientation along the long axis 632, while maintaining a correct electrical connection with the head segment 606 to provide power to the head segment 606 (e.g., having appropriately aligned electrodes on both ends of the battery segment 604).

These alternative orientations may be used to change the weight distribution of the electronic stylus 600 (e.g., if the weight of the battery segment 606 is not uniformly distributed along the long axis 632). In implementations where the battery segment 604 weighs more than the head segment 606, writing or other electronic stylus use can be impacted. A top-heavy electronic stylus can more easily fall over and potentially cause damage to the electronic stylus or a stylus-enabled input device (e.g., the screen of such an input device). Also, a top-heavy electronic stylus can be uncomfortable for a user or become difficult for a user to hold over an extended period of time. For proper writing balance, and to avoid any potential damage or user inconvenience caused by a top-heavy electronic stylus, the battery segment 606 (with a non-uniform weight distribution) may be reversed in its orientation along the long axis 632 to provide better weight distribution in the electronic stylus 600. Alternatively one or more weighting segments can be added and/or removed along the length of the stylus body 602 to adjust the weight distribution of the electronic stylus 600.

In some circumstances, the user may want to disengage or detach the battery segment 604 from the head segment 606. For example, the user may need to recharge a rechargeable battery cell. In an alternative implementation, the user may want to replace the battery segment 604 with a new battery segment holding sufficient charge to power the electronics in the head segment 606. To disengage the battery 604 from the head segment 606, a user can unscrew the threaded attaching end 614 of the battery 604 out of the threaded interior 624 of the head segment 606.

FIG. 7 illustrates a perspective view of another example stylus 700 with a screw mechanism. There are three segments of a body 702, an end segment 740 attached to a battery segment 704, and a head segment 706 attached to the battery segment 704. Alternative implementations may also include multiple battery segments.

The battery segment 704 integrates one or more battery cells having an external casing and is configured as a replaceable, interlocking structural segment along the long axis 710 of the electronic stylus 700. The battery segment 704, alone or in concert with other battery segments of the stylus body 702, can be interconnected in the electronic stylus 700. The battery segment 704 provides power to the communications circuits (not shown) and other stylus electronics via a variety of connections (as described further in detail in FIGS. 8 and 9). Conductive traces within the external casing of the battery segment 704 can be used as a current path for the electrical power connection between battery cell(s) and stylus electronics.

The head segment 706 of the body interacts with a stylus-enabled input system, such as a computer tablet, embedded device, or mobile computer, and communicates input to the stylus-enabled input system via radio frequency, light emission or other transmissions. Communications circuitry (not shown) is located in the head segment 706 of the stylus body 702, and/or other segments of the body of the electronic stylus and facilitates connections between stylus input devices (e.g., an electronic stylus) to a stylus-enabled computing device or input surface (e.g., a tablet computer, drawing tablet, point-of-sale system, touch pad) using or in association with stylus-enabling input technology (e.g., capacitive touch screen technology, wireless technology, Bluetooth, etc.). The communications circuitry is electronically connected to and powered by the battery segment.

As shown in FIG. 7, a user can attach the three segments of the stylus body 702 by a screw locking mechanism. In this implementation, there is a threaded attaching end 714a of the battery segment 704, which has a smaller diameter than the head segment 706. An interior surface 724 of the head segment 706 is also threaded. The user can engage the battery segment 704 with the head segment 706 by screwing the threaded attaching end 714a of the battery segment 704 into the threaded interior surface 724 of the head segment 706.

A threaded attaching end 714b of the battery segment 704 has a smaller diameter than the end segment 740. An interior surface 734 of the end segment 740 is also threaded. The user can engage the battery segment 704 with the end segment 740 by screwing the threaded attaching end 714b of the battery segment 704 into the threaded interior surface 734 of the end segment 740.

The head segment 706 includes an electrode 725 to electrically connect to the battery segment 704. Another electrode (not shown) is also provided by the head segment 706. Both electrodes electrically connected to corresponding electrodes in the battery segment 704 to complete the power supply circuit. Corresponding electrodes are available with regard to the end segment 740.

To disengage the battery segment 704 from the head segment 706 and the end segment 740, a user can unscrew the threaded attaching ends 714a and 714b of the battery segment 704 out of the threaded interior 724 of the head segment 706 and the threaded interior surface 734 of the end segment 740, respectively. To change the orientation of the battery segment 704, the user can then screw the attaching end 714a into the threaded interior surface 734 of the end segment 740 and screw the attaching end 714b into the threaded interior surface 724 of the head segment 706.

FIG. 8 illustrates a cross-sectional view 800 of the example stylus in FIG. 7. There are three segments of a stylus body 802, an end segment 840 attached to a battery segment 804, and a head segment 806 attached to the battery segment 804. Alternative implementations may also include multiple battery segments.

The battery segment 804 integrates one or more battery cells having an external casing and is configured as a replaceable, interlocking structural segment along the long axis 810 of the electronic stylus 800. The battery segment 804, alone or in concert with other battery segments of the stylus body 802, can be interconnected in the electronic stylus 800. The battery segment 804 provides power to the communications circuits (not shown) and other stylus electronics via a variety of connections (as described further in detail in FIG. 9). Conductive traces within the external casing of the battery segment 904 can be used as a current path for the electrical power connection between battery cell(s) and stylus electronics.

The head segment 806 of the body interacts with a stylus-enabled input system, such as a computer tablet, embedded device, or mobile computer, and communicates input to the stylus-enabled input system via radio frequency, light emission or other transmissions. Communications circuitry (e.g., communications circuitries 808a and 808b) is located in the head segment 806 of the body, and/or other segments of the body of the electronic stylus and facilitates connections between stylus input devices (e.g., an electronic stylus) to a stylus-enabled computing device or input surface (e.g., a tablet computer, drawing tablet, point-of-sale system, touch pad) using or in association with stylus-enabling input technology (e.g., capacitive touch screen technology, wireless technology, Bluetooth, etc.). The communications circuitry is electronically connected to and powered by the battery segment.

The battery segment 804 can provide power to the stylus electronics via a variety of connections. For example, a current path or routing channel 842 can run from the battery cell(s) through the external casing of the battery segment 804 to electrodes 838a and 838b. Likewise, a current path or routing channel can run from the stylus electronics through the shell of the head segment 806 to electrodes 828a and 828b. These electrodes provided a current path from the battery segment 804 to power the stylus electronics in the head segment 806.

As shown in FIG. 8, the current path or routing channel 842 can also run from the battery cell(s) in the battery segment 804 through the external casing of the battery segment 804 to electrodes 848a and 848b. Likewise, a current path or routing channel can run from the end segment electronics through the shell of the end segment 840 to electrodes 858a and 858b. These electrodes provided a current path from the battery segment 804 to power the end segment electronics.

As shown in FIG. 8, a user can attach the three segments of the stylus body 802 by a screw locking mechanism. In this implementation, there is a threaded attaching end 814a of the battery segment 804, which has a smaller diameter than the head segment 806. An interior surface 824 of the head segment 806 is also threaded. The user can engage the battery segment 804 with the head segment 806 by screwing the threaded attaching end 814a of the battery segment 804 into the threaded interior surface 824 of the head segment 806.

There is a threaded attaching end 814b of the battery segment 804, which has a smaller diameter than the end segment 840. An interior surface 834 of the end segment 840 is also threaded. The user can engage the battery segment 804 with the end segment 840 by screwing the threaded attaching end 814*b* of the battery segment 804 into the threaded interior surface 834 of the end segment 840.

To disengage the battery segment 804 from the head segment 806 and the end segment 840, a user can unscrew the threaded attaching ends 814*a* and 814*b* of the battery segment 804 out of the threaded interior 824 of the head segment 706 and the threaded interior 834 of the end segment 840, respectively. The user can then screw the attaching end 814*a* into the threaded interior surface 834 of the end segment 840. Similarly, the user can screw the attaching end 814*b* into the threaded interior surface 824 of the head segment 806.

In such implementations, the attachment mechanisms on the end of the end segment 840 and the head segment 806 are configured to receive both ends of the battery 804 segment, wherein each end of the battery 804 segment has a positive terminal and a negative terminal on each side of the battery cell.

FIG. 9 illustrates a schematic of an example interlocking integrated battery structure for an electronic stylus 900. The electronic stylus 900 includes at least a battery segment 902, which includes a battery 904, and a head segment 906, which includes stylus electronics 908 (e.g., for communication, input/output, an on/off switch, light sources/sensors, a recharging port, etc.). The illustrated implementation of the electronic stylus 900 also includes an end segment 910, which includes other electronics (e.g., for communication, input/output, an on/off switch, light sources/sensors, a recharging port, etc.), although other implementations may omit the end segment 910 or alternatively reduce the electronics in the head segment 906 and place all or most of the electronics in the end segment 910. Each segment 902, 906, and 910 is configured with electrodes for electrically connecting the battery 904 and the electronics 908 and 912, as shown in the schematic. Alternative implementations may also include multiple battery segments, with interlocking ends and aligning electrodes.

Figure 10:
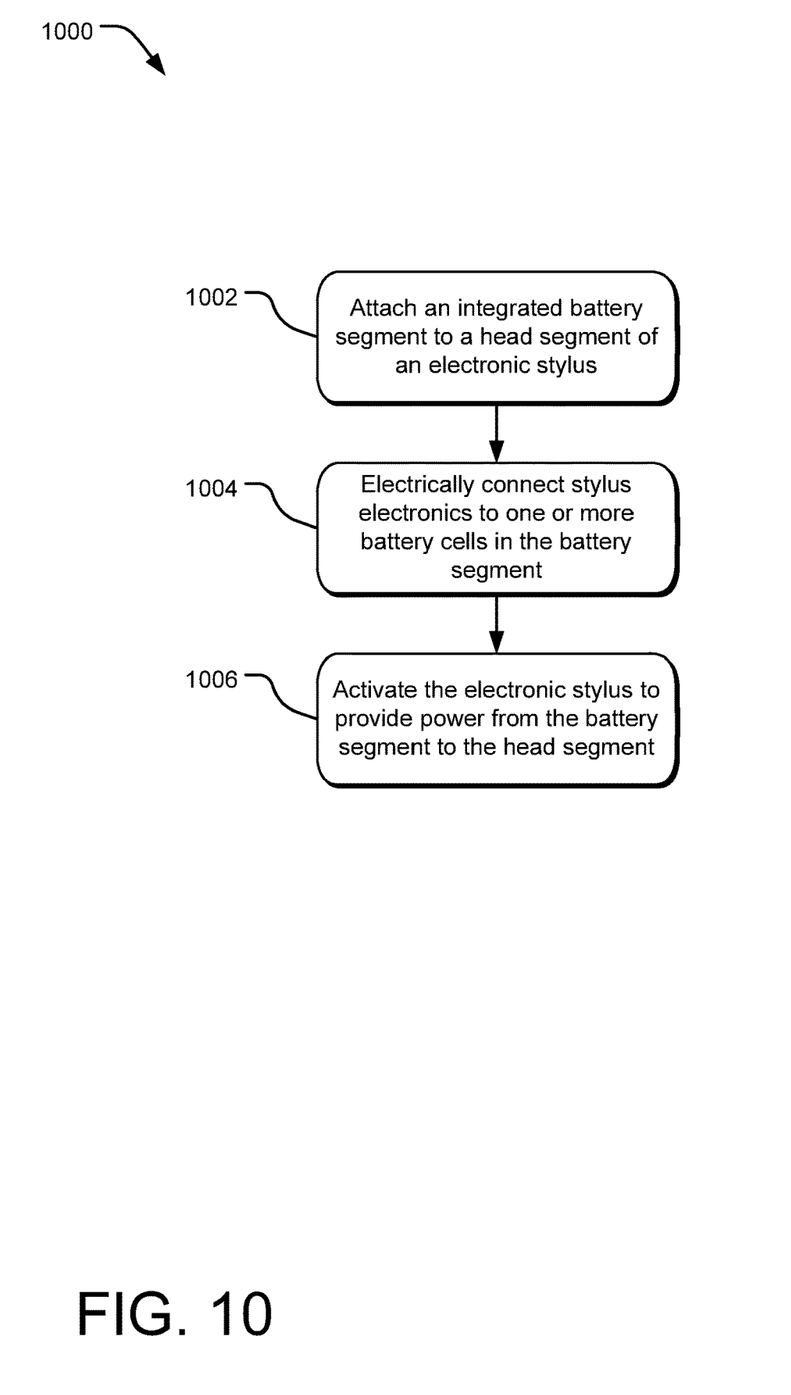
FIG. 10 illustrates example operations for powering an electronic stylus with an interlocking integrated battery structure.

FIG. 10 illustrates example operations 1000 for using an electronic stylus with an interlocking integrated battery segment. The operations 1000 are described with regard to powering an electronic stylus disclosed in the examples of FIGS. 1-9, but other applications, systems, and electronic styluses or pens are also contemplated.

An attaching operation 1002 attaches the interlocking integrated battery segment to a head segment of an electronic stylus using an attaching mechanism (e.g., latch mechanism, screw mechanism, friction fit, cam lock, bayonet lock, etc.). The attaching mechanism can be built into one of the battery segment or the head segment or distributed between the two. A connection operation 1004 electrically connects stylus electronics to one or more battery cells in the battery segment. For example, various types of electrodes can be aligned in cooperation with the attaching mechanism to provide power conduits between the battery segment and the head segment. An activation operation 1006 activates the electronic stylus to provide power from the battery segment to the stylus electronics in the head segment.

In other implementations, a similar set of operations may be used to assembly an end segment to a battery segment to power electronic circuitry in the end segment. In yet another implementation, similar attaching operations and connecting operations may be used to assembly additional battery segments and/or weighting segments along the long axis of the electronic stylus.

The described operations can occur in the order described, in another order, or some of the operations can occur simultaneously.

An example electronic stylus includes a head segment configured to house communications one or more communication circuits that communicate with a stylus-enabled input device. A battery segment includes an integrated external casing. The battery segment is removably attached and electrically coupled to the head segment to supply electric power to the one or more communications circuits of the head segment. The battery segment forms a structural segment along the long axis of the electronic stylus. The external casing of the battery segment operates as a part of the exterior surface of the electronic stylus.

An example electronic stylus of any preceding electronic stylus includes the battery segment having positive and negative electrodes for electrically coupling to electrodes of the head segment of the electronic stylus.

An example electronic stylus of any preceding electronic stylus includes the battery segment having an interlocking structure configured to connect the battery segment to the head segment.

An example electronic stylus of any preceding electronic stylus includes the interlocking structure as a screw structure.

An example electronic stylus of any preceding electronic stylus includes the interlocking structure as a latch mechanism.

An example electronic stylus of any preceding electronic stylus includes the interlocking structure as the latch mechanism as a spring-loaded latch mechanism.

An example electronic stylus of any preceding electronic stylus includes the exterior casing of the battery segment having at least one electronic current path conductor.

An example electronic stylus of any preceding electronic stylus includes the battery segment having two ends and a non-uniform weight distribution. The battery segment including interlocking structures and electrodes at each of two ends allowing interlocking and electrical connection with the head segment in at least two orientations along the long axis of the electronic stylus.

An example electronic stylus of any preceding electronic stylus includes a battery cell in the battery segment with a positive electrode and a negative electrode on at least one end of the battery segment.

An example structural battery segment includes a battery component and a casing forming an integrated external surface of the battery component. The casing and the battery component are configured to form the structural battery segment along a long axis of an electronic stylus. The structural battery segment provides one or more interlocking structures configured to connect to one or more other segments of the electronic stylus and positive and negative electrodes from the battery component configured to supply electrical power to the one or more other segments of the electronic stylus.

An example structural battery segment of any previous structural battery segment includes the casing of the structural battery segment operating as a part of an exterior surface of the electronic stylus.

An example structural battery segment of any previous structural battery segment includes the battery component supplying power to stylus electronics via the electrodes and at least one electronic current path in the casing of the structural battery segment.

An example structural battery segment of any previous structural battery segment includes a locking mechanism configured to attach the head segment to the structural battery segment and to attach the structural battery segment to the end segment.

An example structural battery segment of any previous structural battery segment includes at least one weight is located in the head segment and at least one other weight is located in the end segment.

An example structural battery segment of any previous structural battery segment includes the battery segment that can be rotated 180° for use between the head segment and the end segment.

The structural battery segment of any previous structural battery segment, wherein the battery component includes a battery cell with a positive electrode and a negative electrode on at least one end of the battery segment.

An example structural battery segment of any previous structural battery segment includes at least one weight to balance the weight distribution of the electronic stylus.

An example method includes supplying electrical power to one or more circuits in a head segment of an electronic stylus from a removable battery segment that is removably connected to the head segment as a structural segment along the long axis of the electronic stylus.

An example method of any preceding method employs the removable battery segment that includes an integrated external casing and supplies an electrical connection between the removable battery segment and the one or more circuits of the electronic stylus via a conductive electrical path in the external casing of the removable battery segment.

An example method of any preceding method interlocks the removable battery segment to the head segment of the electronic stylus.

Furthermore, it should be understood that logical operations may be performed in any order, adding and omitting as desired, unless explicitly claimed otherwise or the claim language inherently necessitates a specific order.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. An electronic stylus comprising:
   a head segment configured to house one or more communications circuits that communicate with a stylus-enabled input device; and
   a battery segment having an integrated external casing integrated with a battery component, the battery segment being removably attached and electrically coupled to the head segment to supply electric power to the one or more communications circuits of the head segment, the battery segment forming a structural segment along a long axis of the electronic stylus, wherein the external casing of the battery segment operates as a part of the exterior surface of the electronic stylus, the battery segment having two ends and a non-uniform weight distribution, the battery segment including interlocking structures and electrodes at each of the two ends allowing interlocking and electrical connection with the head segment in at least two orientations along the long axis of the electronic stylus.

2. The electronic stylus of claim 1, wherein the electrodes are positive and negative electrodes for electrically coupling to electrodes of the head segment of the electronic stylus.

3. The electronic stylus of claim 1, wherein the interlocking structures are screw structures.

4. The electronic stylus of claim 1, wherein the interlocking structures are latch mechanisms.

5. The electronic stylus of claim 4, wherein the latch mechanisms are spring-loaded latch mechanisms.

6. The electronic stylus of claim 1, wherein the exterior casing of the battery segment includes at least one electronic current path conductor.

7. The electronic stylus of claim 1, further comprising a battery cell in the battery segment with a positive electrode and a negative electrode on at least one end of the battery segment.

8. A structural battery segment comprising:
   a battery component;
   a casing forming an integrated external surface of the battery component, the casing and the battery component configured to form the structural battery segment along a long axis of an electronic stylus, the structural battery segment providing one or more interlocking structures configured to removably attach to a stylus head segment and to connect to one or more other segments of the electronic stylus and positive and negative electrodes from the battery component configured to supply electrical power to the one or more other segments of the electronic stylus; and
   a locking mechanism configured to attach a head segment to the structural battery segment and to attach the structural battery segment to an end segment such that the battery segment can be rotated 180° such that the orientation of the battery segment can be reversed along a long axis of the battery segment for use between the head segment and the end segment.

9. The structural battery segment of claim 8, wherein the casing of the structural battery segment operates as a part of an exterior surface of the electronic stylus.

10. The structural battery segment of claim 8, wherein the battery component supplies power to stylus electronics via the electrodes and at least one electronic current path in the casing of the structural battery segment.

11. The structural battery segment of claim 8, wherein at least one weight is located in the head segment and at least one other weight is located in the end segment.

12. The structural battery segment of claim 8, wherein the battery component further comprises a battery cell with a positive electrode and a negative electrode on at least one end of the battery segment.

13. The structural battery segment of claim 8, further comprising at least one weight to balance the weight distribution of the electronic stylus.

14. A method comprising:
   supplying electrical power to one or more circuits in a head segment of an electronic stylus from a removable structural battery segment having an external casing integrated with a battery component that is removably connected to the head segment as a structural segment along a long axis of the electronic stylus; and
   interlocking the removable battery segment to the head segment of the electronic stylus, the battery segment including interlocking structures at each of two ends of the battery segment allowing interlocking and electrical connection with the head segment in at least two orientations along the long axis of the electronic stylus.

15. The method of claim 14, wherein the removable battery segment includes an integrated external casing and the supplying operation comprises:
   supplying an electrical connection between the removable battery segment and the one or more circuits of the electronic stylus via a conductive electrical path in the external casing of the removable battery segment.

* * * * *